(12) United States Patent
Sang et al.

(10) Patent No.: US 11,378,582 B2
(45) Date of Patent: Jul. 5, 2022

(54) SYSTEMS AND METHODS FOR AUTOMATED SAMPLE HANDLING

(71) Applicant: ACCURE HEALTH, INC., Cambridge, MA (US)

(72) Inventors: Liyun Sang, Cambridge, MA (US); Guang Chen, Newton, MA (US); Qiang Liu, Cambridge, MA (US)

(73) Assignee: ACCURE HEALTH, INC., Cambridge, MA (US)

( * ) Notice: Subject to any disclaimer, the term of this patent is extended or adjusted under 35 U.S.C. 154(b) by 341 days.

(21) Appl. No.: 16/591,545

(22) Filed: Oct. 2, 2019

(65) Prior Publication Data

US 2020/0110101 A1    Apr. 9, 2020

Related U.S. Application Data

(60) Provisional application No. 62/742,884, filed on Oct. 8, 2018.

(51) Int. Cl.
*G01N 35/00* (2006.01)
*G01N 33/50* (2006.01)

(52) U.S. Cl.
CPC ............... *G01N 35/00029* (2013.01); *G01N 2035/00099* (2013.01)

(58) Field of Classification Search
None
See application file for complete search history.

(56) References Cited

U.S. PATENT DOCUMENTS

2009/0176308 A1 *  7/2009  Griebel ............... B01F 11/0082
                                                    436/8
2020/0300877 A1 *  9/2020  Choi .................. G01N 35/0098

FOREIGN PATENT DOCUMENTS

WO    WO-2017132564 A2 *  8/2017  ....... G01N 33/54326
WO    WO-2018143680 A1 *  8/2018  ........... G01N 21/645

* cited by examiner

*Primary Examiner* — Kathryn Wright
(74) *Attorney, Agent, or Firm* — Bayes PLLC (57) ABSTRACT

Embodiments of systems and methods for automated sample handling are disclosed. In an example, a system for automated sample handling includes reaction wells, a magnet, a magnetic manipulator, and a punch. The reaction wells are configured to each hold a reagent and collectively move horizontally. A first reaction well holds magnetic beads, and a second reaction well is partitioned by a seal. The magnet is configured to move vertically and capture the magnetic beads on a bottom surface of the first reaction well when moving to an upper position beneath the first reaction well. The magnetic manipulator is configured to manipulate the magnetic beads and includes a magnetic rod configured to move vertically to be above or in the first reaction well and a sheath below the magnetic rod and configured to move vertically and receive the magnetic rod. The punch is configured to move vertically and break the seal of the second reaction well when moving to a lower position in the second reaction well.

17 Claims, 9 Drawing Sheets

SYSTEMS AND METHODS FOR AUTOMATED SAMPLE HANDLING

CROSS REFERENCE TO RELATED APPLICATION

The present application is based on and claims the benefits of priority to U.S. Provisional Application No. 62/742,884, filed Oct. 8, 2018, which is incorporated herein by reference in its entirety.

BACKGROUND

Embodiments of the present disclosure relate to systems and methods for automated sample handling.

An assay is an investigative or analytic sample handling procedure in laboratory, medicine, pharmacology, environmental biology, and molecular biology for qualitatively assessing or quantitatively measuring the presence, amount, or functional activity of a target entity (the analyte). Assays have become a routine part of modern medical, environmental, pharmaceutical, forensic, and many other businesses at various scales from industrial to curbside or field level. Conducting assay sample handling procedures manually is not only labor-intensive but also error-prone. Sample handling automation has many benefits including low labor costs, high productivity, and high accuracy.

SUMMARY

Embodiments of systems and methods for automated sample handling processing are disclosed herein.

In one example, a system for automated sample handling includes a plurality of reaction wells, a magnet, a magnetic manipulator, and a punch. The plurality of reaction wells are configured to each hold a reagent and collectively move horizontally. A first reaction well of the plurality of reaction wells holds magnetic beads, and a second reaction well of the plurality of reaction wells is partitioned by a seal. The magnet is configured to move vertically and capture the magnetic beads on a bottom surface of the first reaction well when moving to an upper position beneath the first reaction well. The magnetic manipulator is configured to manipulate the magnetic beads and includes a magnetic rod configured to move vertically to be above or in the first reaction well and a sheath below the magnetic rod and configured to move vertically and receive the magnetic rod. The punch is configured to move vertically and break the seal of the second reaction well when moving to a lower position in the second reaction well.

In another example, a system for automated sample handling includes an array of reaction wells, an array of magnets below the array of reaction wells, an array of magnetic rods, and an array of sheaths between the array of magnetic rods and the array of reaction wells. The array of reaction wells is configured to each hold a reagent and collectively move horizontally. At least a first column of the array of reaction wells hold magnetic beads. The array of magnets is configured to collectively move vertically and capture the magnetic beads on bottom surfaces of the first column of the array of reaction wells when moving to an upper position beneath the first column of the array of reaction wells, an array of magnetic rods is configured to collectively move vertically. The array of sheaths is configured to collectively move vertically and receive the array of magnetic rods, such that the array of sheaths and the array of magnetic rods move independently to manipulate the magnetic beads.

In further another example, a method for automated sample handling is disclosed. A sheath, a magnetic rod received by the sheath, and a punch connected horizontally with the sheath simultaneously move down to a lower position, such that (i) the sheath and the magnetic rod received by the sheath are in a first reaction well holding magnetic beads, and (ii) the punch breaks a seal partitioning a second reaction well to fill a reagent in the second reaction well. The sheath and the magnetic rod received by the sheath capture the magnetic beads in the first reaction well. The sheath, the magnetic rod received by the sheath, and the punch simultaneously move up to an upper position above the first and second reaction wells while holding the magnetic beads by the sheath and the magnetic rod received by the sheath. The first and second reaction wells simultaneously move horizontally, such that the sheath and the magnetic rod received by the sheath are aligned with the second reaction well. The sheath and the punch simultaneously move down to the lower position, such that the sheath and the magnetic beads held by the sheath are in the reagent of the second reaction well. A magnet moves above to an upper position beneath the second reaction well to capture the magnetic beads on a bottom surface of the second reaction well.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Embodiments of the present disclosure will be described with reference to the accompanying drawings.

DETAILED DESCRIPTION

Although specific configurations and arrangements are discussed, this should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to affect such feature, structure or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various embodiments in accordance with the present disclosure use self-designed components and linear actuators to automate (sample-in, answer-out) assay pipeline including analyte capture, labeling, wash, and detection. Compared to other alternatives (e.g., microfluidics, acoustic), linear actuators would be easier to implement and debug, and cost-effective for production. In some embodiments, the system disclosed herein utilizes coordinated linear movements of reaction wells, magnets, magnetic manipulators, and punches to achieve automatic sample process and detection. For example, the coordinated movements of magnetic manipulators and magnets can be used for magnetic beads dispersing in sample preparation. In some embodiments, the system disclosed herein utilize seals in some reactions wells along with punches to facilitate reagent storage and dilution. The systems and methods disclosed herein can be used in performing any suitable arrays in different applications, such as in the fields of biotechnology, biochemistry, and biomedicine.

Figure 1:
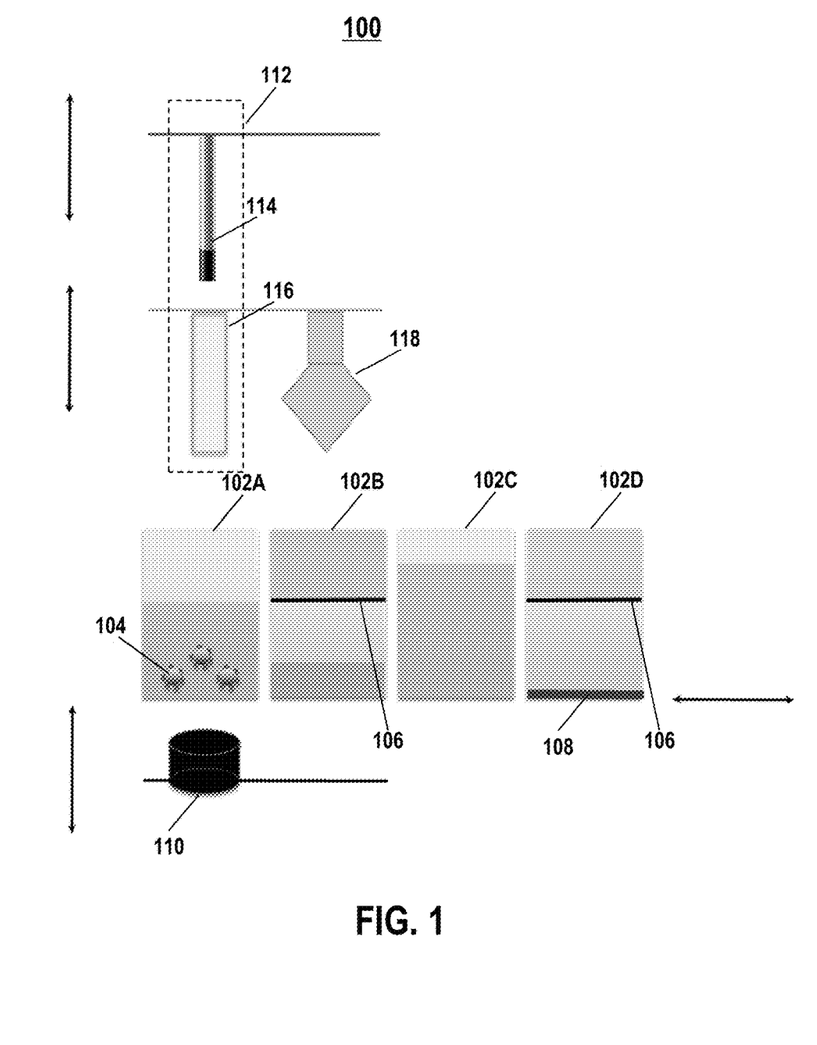
FIG. 1 illustrates a schematic diagram, in a side view, of an exemplary system for automated sample handling, according to some embodiments of the present disclosure.

FIG. 1 illustrates a schematic diagram, in a side view, of an exemplary system for automated sample handling, according to some embodiments of the present disclosure. The system 100 can include a magnetic manipulator 112, a punch 118, four reaction wells 102A, 102B, 102C, and 102D, and a magnet 110. It is understood that the number of reaction wells is not limited to four. That is, the system 100 can include a plurality of reaction wells depending on the specific need, for example, the assay to be performed. The four reaction wells 102A, 102B, 102C, and 102D shown in FIG. 1 are configured to each hold a pre-packaged reagent and collectively move horizontally. In some embodiments, the four reaction wells 102A, 102B, 102C, and 102D are arranged along a direction in which the reaction wells 102A, 102B, 102C, and 102D collectively move. For example, the reaction wells 102A, 102B, 102C, and 102D collectively move horizontally and are arranged along the horizontal direction. In some embodiments, each of the reaction wells 102A, 102B, 102C, and 102D has the same dimension. All reaction wells 102A, 102B, 102C, and 102D may be sealed until use.

The first reaction well 102A can hold magnetic beads 104 in a clinical sample (such as a urine sample). In some embodiments, the magnetic bead 104 includes one or more inner magnetic cores and an outer coating, e.g., a capping polymer. In some embodiments, the magnetic cores can be monometallic (e.g., Fe, Ni, Co), bimetallic (e.g., FePt, SmCo, FePd, FeAu) or can be made of ferrites (e.g., $Fe_2O_3$, $Fe_3O_4$, $MnFe_2O_4$, $NiFe_2O_4$, $CoFe_2O_4$). The clinical sample is collected from a subject (e.g., a sample of biological fluid, such as blood, urine, saliva, CSF, ascites, and pleural fluid), according to some embodiments. One or more analytes, such as cells, extracellular vesicles (EVs) such as microvesicles, membrane particles, apoptotic blebs or vesicles, or exosomes, proteins (e.g., secreted, transmembrane and cytosolic proteins, degraded proteins, post-translationally modified proteins), nucleic acids (e.g. mRNA, DNA, and microRNA among others), peptides, lipids, metabolites, and other molecules, may be present in the clinical sample with certain concentration to be detected.

The second reaction well 102B can hold a labeling reagent (such as a concentrated antibody) and a dilution-washing buffer that are partitioned by a seal 106. In some embodiments, the labeling reagent is held below the seal 106 while the dilution-washing buffer is held above the seal 106. The labeling reagent can include any suitable labeling ligand (such as antibodies). In some embodiments, the labeling ligand is conjugated to a gold nanoparticle (AuNP) with or without an oxidizing enzyme. The seals 106 may be one or more breakable division layers used to improve reagent storage, for example, polymer films. In some embodiments, the first reaction well 102A and the second reaction well 102B are adjacent to one another according to the design of the assay.

The third reaction well 102C can hold a dilution-washing buffer, and the fourth reaction well 102D can hold an electrode 108 (such as a screen-printed electrode "SPE") and an electron mediator reagent partitioned by a seal 106. The electron mediator reagent can contain any suitable electron mediator that can cause an oxidation-reduction reaction between the electron mediator and the reporter enzyme, which produces current that can be measured by the electrode 108. Different electron mediator can be used, depending on the choice of a reporter enzyme. For example, when the reporter enzyme comprises HRP, the electron mediator can include water-soluble substrates such as ABTS (2,2'-Azinobis [3-ethylbenzothiazoline-6-sulfonic acid]-diammonium salt), OPD (o-phenylenediamine dihydrochloride), and/or TMB (3,3',5,5'-tetramethylbenzidine). In another example, when the reporter enzyme comprises alkaline phosphatase, the electron mediator can include water-soluble substrates such as PNPP (p-nitrophenyl phosphate). In another example, when the reactive enzyme includes beta-galactosidase, the electron mediator can include water-soluble substrates such as ONPG (o-nitrophenyl-β-D-galactopyranoside), Nap-Gal (Naphthol-AS-Bl-beta-D-galactopyranosidase), and/or MUm-Gal (4-Methyl-umbelliferyl-beta-D-galactopyranosidase).

The magnetic manipulator 112 includes a magnetic rod 114 and a sheath 116 below the magnetic rod 114. The magnetic rod 114 is configured to move vertically to an upper position above a reaction well 102A, 102B, 102C, or 102D or a lower position in a reaction well 102A, 102B, 102C, or 102D. The entirety or a part (e.g., the tip) of the magnetic rod 114 may include a magnet, either a permanent magnet or an electromagnet. The sheath 116 is configured to move vertically and receive the magnetic rod 114. For example, the sheath 116 may be a tube in which at least the magnet part of the magnetic rod 114 can be inserted. The sheath 116 can physically separate the magnetic rod 114 from directly contacting the magnetic beads 104 while still allowing the magnetic field of the magnetic rod 114 to pass in order to attract the magnetic beads 104.

The magnetic manipulator 112 is configured to manipulate the magnetic beads 104, such as transferring or mixing the magnetic beads 104. In some embodiments, the magnetic manipulator 112 is configured to mix the magnetic beads 104 with the reagent in the first reaction well 102A. To mix the magnetic beads 104 with the reagent, the sheath 116 may be configured to receive the magnetic rod 114 when moving to a middle position in the first reaction well 102A above a liquid-air interface, i.e., the top surface of the reagent. In some embodiments, the magnetic manipulator 112 is further configured to transfer the magnetic beads 104 from the first reaction well 102A to another reaction well 102B, 102C, or 102D as the reaction wells 102A, 102B, 102C, and 102D collectively move horizontally. To transfer the magnetic beads 104, the sheath 116 may be configured to capture the magnetic beads 104 when receiving the magnetic rod 114 and moving to a lower position in the reagent of the first reaction well 102A, hold the magnetic beads 104 when moving to an upper position above the first reaction well 102A while the reaction wells 102A, 102B, 102C, and 102D collectively move horizontally, and release the magnetic beads 104 when separating from the magnetic rod 114 and moving to the lower position in the reagent of another reaction well 102B, 102C, or 102D.

The punch 118 is configured to move vertically to an upper position above a reaction well 102A, 102B, 102C, or 102D or a lower position in a reaction well 102A, 102B, 102C, or 102D. The punch 118 is further configured to break the seal 106 in a reaction well 102B or 102D when moving to the lower position in the reaction well 102B or 102D. In some embodiments, the punch 118 includes a sharp tip for breaking the seal 106. In some embodiments, the sheath 116 and the punch 118 are connected horizontally to collectively move vertically. In some embodiments, the sheath 116 and the punch 118 are aligned with two adjacent reaction wells of the reaction wells 102A, 102B, 102C, and 102D, respectively. For example, the distance between sheath 116 and the punch 118 may be substantially the same as the distance between two adjacent reaction wells of the reaction wells 102A, 102B, 102C, and 102D.

The magnet 110 may be a permanent magnet or an electromagnet. The coordination between the magnetic rod 114 and the magnet 110 facilitate magnetic beads releasing, mixing, and enrichment for signal amplification and detection. In some embodiments, the magnet 110 is configured to move vertically and capture the magnetic beads 104 on a bottom surface of the first reaction well 102A when moving to an upper position beneath the first reaction well 102A. In some embodiments, the magnet 110 is also configured to release the magnetic beads 104 when moving to a lower position beneath the first reaction well 102A. In some embodiments, the magnet 110 is further configured to capture the magnetic beads 104 on a bottom surface of another reaction well 102B, 102C, or 102D when moving to the upper position beneath the reaction well 102B, 102C, or 102D while the sheath 116 releases the magnetic beads 104 in the reagent of the reaction well 102B, 102C, or 102D.

Various actuators can be used to facilitate and coordinate the vertical and horizontal movements of the various functional units of system 100 described above, and various stepper motors can be utilized to independently drive the movements of the various actuators. In some embodiments, the reaction wells 102A, 102B, 102C, or 102D are fixed vertically, i.e., collectively move horizontally only. In some embodiments, the magnet 110 is fixed horizontally, i.e., moves vertically only. Similarly, in some embodiments, each of the magnetic rod 114 and the sheath 116 of the magnetic manipulator 112 and the punch 118 is fixed horizontally, i.e., moves vertically only.

FIGS. 2A-2D illustrate various exemplary automated sample handling steps in performing an assay, according to various embodiments of the present disclosure. The sample handling method according to embodiments of the present disclosure generally includes four assay steps: capture, labeling, wash, and detection. After each step, the reaction wells will be shifted leftwards to the next position. System 100 may be one example of the systems for performing the automated sample handling steps described in FIGS. 2A-2D.

Figure 2A:
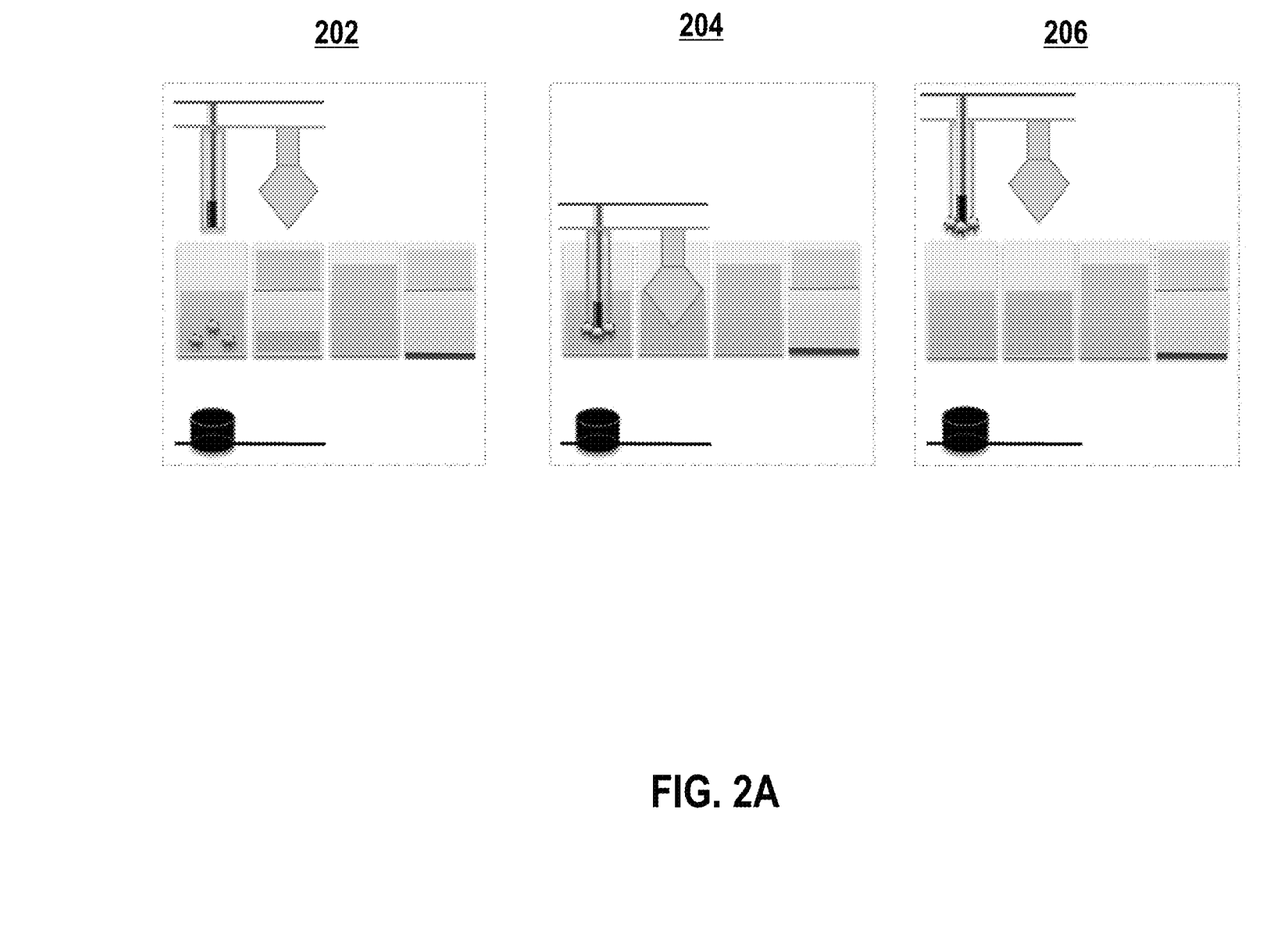
FIGS. 2A-2D illustrate various exemplary automated sample handling steps in performing an assay, according to various embodiments of the present disclosure.

FIG. 2A illustrates the capture step and includes the following sub-steps: at sub-step 202, the magnetic rod 114, the sheath 116, and the punch 118 are at their upper position above the first and second reaction wells 102A and 102B, and the magnet 110 is at its lower position; at sub-step 204, the magnetic rod 114, the sheath 116, and the punch 118 are moved to their lower position in the first and second reaction wells 102A and 102B, respectively, the magnetic rod 114 and the sheath 116 capture the magnetic beads 104 in the first reaction well 102A, and the punch 118 breaks the seal 106 in the second reaction well 102B; and at sub-step 206, the magnetic rod 114, the sheath 116, and the punch 118 are moved back to their upper position with the magnetic beads 104 being attached to the sheath 116. After the capture step, the reactions wells 102A, 102B, 102C, and 102D will be shifted leftwards to the next position.

Figure 2B:
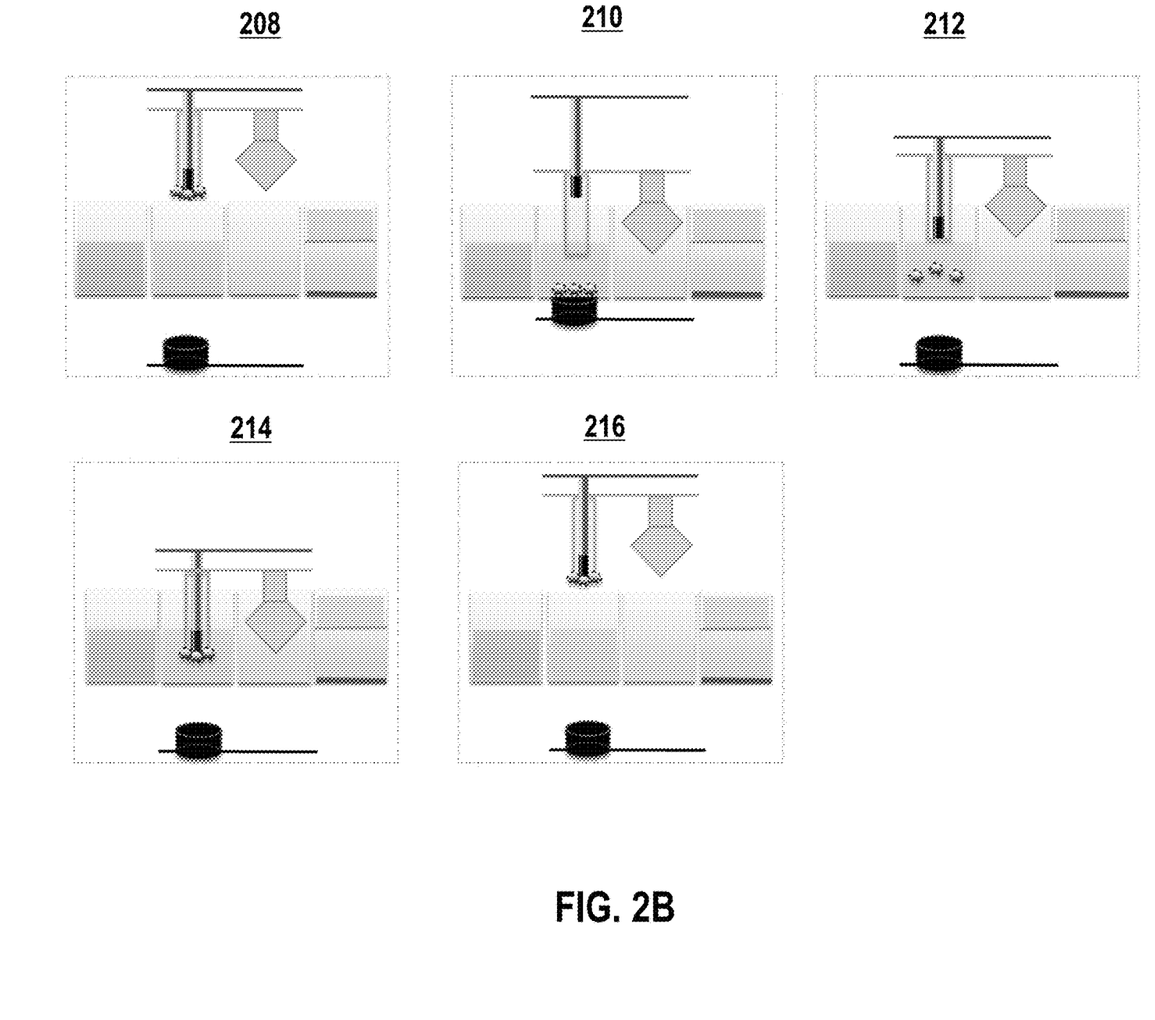

FIG. 2B illustrates the labeling step and includes the following sub-steps: at sub-step 208, the magnetic rod 114, the sheath 116, and the punch 118 are at their upper position above the second and third reaction wells 102B and 102C, and the magnet 110 is at its lower position; at sub-step 210, the magnetic rod 114 remains at its upper position while the sheath 116 and the punch 118 are moved to their lower position in the second and third reaction wells 102B and 102C, respectively, the sheath 116 releases the magnetic beads 104 in the second reaction well 102B, and the magnet 110 is moved to its upper position beneath the second reaction well 102B to capture the released magnetic beads 104 to the bottom surface of the second reaction well 102B; at sub-step 212, the magnet 110 is moved back to its lower position and releases the magnetic beads 104 from the bottom surface of the second reaction well 102B, and the magnetic rod 114 is moved to its lower position inside the sheath 116 in the second reaction well 102B; sub-step 210 and 212 will be repeated a number of times; at sub-step 214, the magnetic rod 114 and the sheath 116 capture the magnetic beads 104 in the second reaction well 102B; at sub-step 216, the magnetic rod 114, the sheath 116, and the punch 118 are moved to their upper position above the second and third reaction wells 102B and 102C with the magnetic beads 104 being attached to the sheath 116. After the labeling step, the reactions wells 102A, 102B, 102C, and 102D will be shifted leftwards to the next position.

Figure 2C:
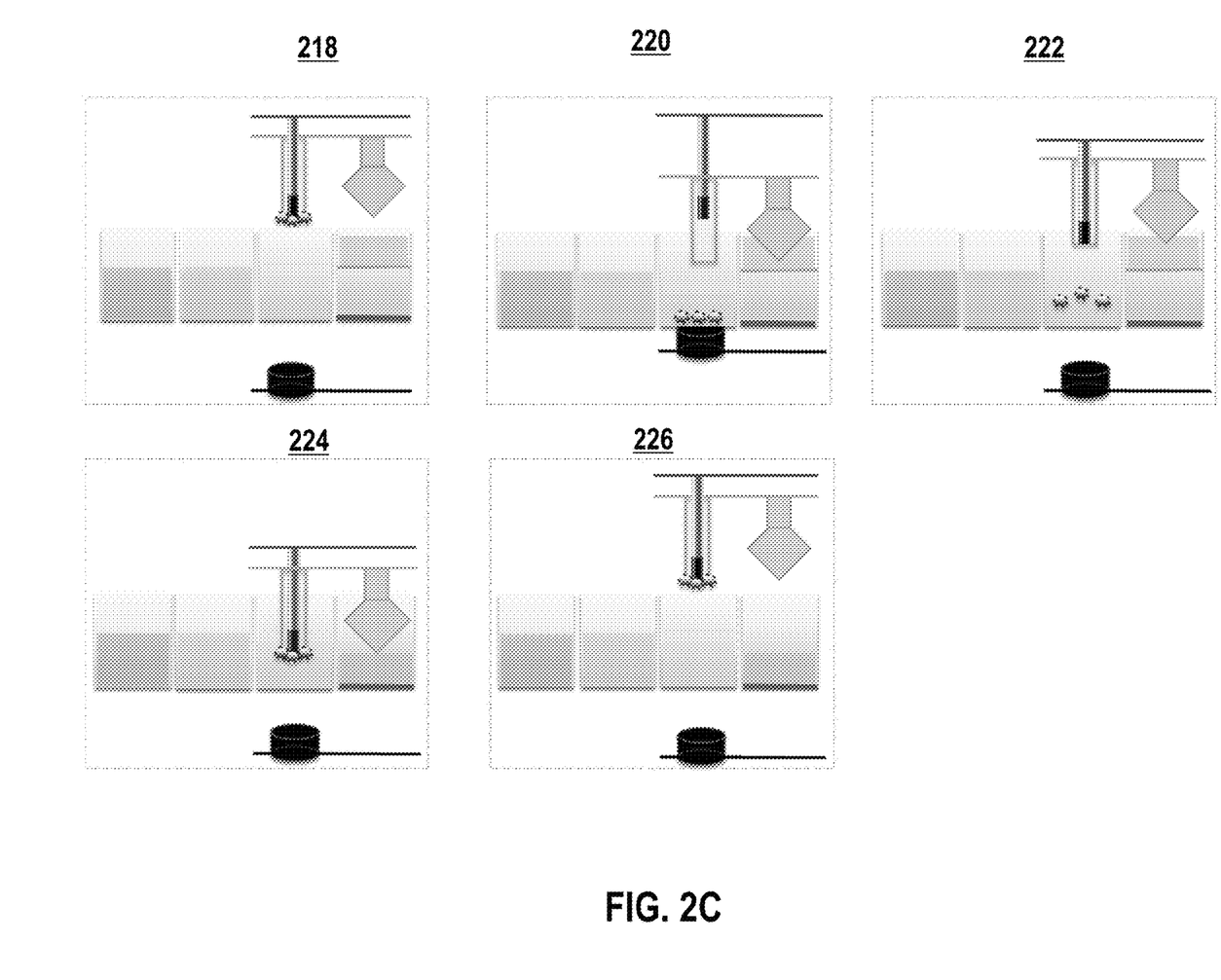

FIG. 2C illustrates the wash step and includes the following sub-steps: at sub-step 218, the magnetic rod 114, the sheath 116, and the punch 118 are at their upper position above the third and fourth reaction wells 102C and 102D, and the magnet 110 is at its lower position; at sub-step 220, the magnetic rod 114 remains at its upper position while the sheath 116 and the punch 118 are moved to their lower position in the third and fourth reaction wells 102C and 102D, respectively, the sheath 116 releases the magnetic beads 104 in the third reaction well 102C, the magnet 110 is moved to its upper position beneath the third reaction well 102C to capture the released magnetic beads 104 to the bottom surface of the third reaction well 102C, and the punch 118 breaks the seal 106 in the fourth reaction well 102D; at sub-step 222, the magnet 110 is moved back to its lower position and releases the magnetic beads 104 from the bottom surface of the third reaction well 102C, and the magnetic rod 114 is moved to its lower position inside the sheath 116 in the third reaction well 102C; sub-step 220 and 222 will be repeated a number of times; at sub-step 224, the magnetic rod 114 and the sheath 116 capture the magnetic beads 104 in the third reaction well 102C; at sub-step 226, the magnetic rod 114, the sheath 116, and the punch 118 are moved to their upper position above the third and fourth reaction wells 102C and 102D with the magnetic beads 104 being attached to the sheath 116. After the wash step, the reactions wells 102A, 102B, 102C, and 102D will be shifted leftwards to the next position.

Figure 2D:
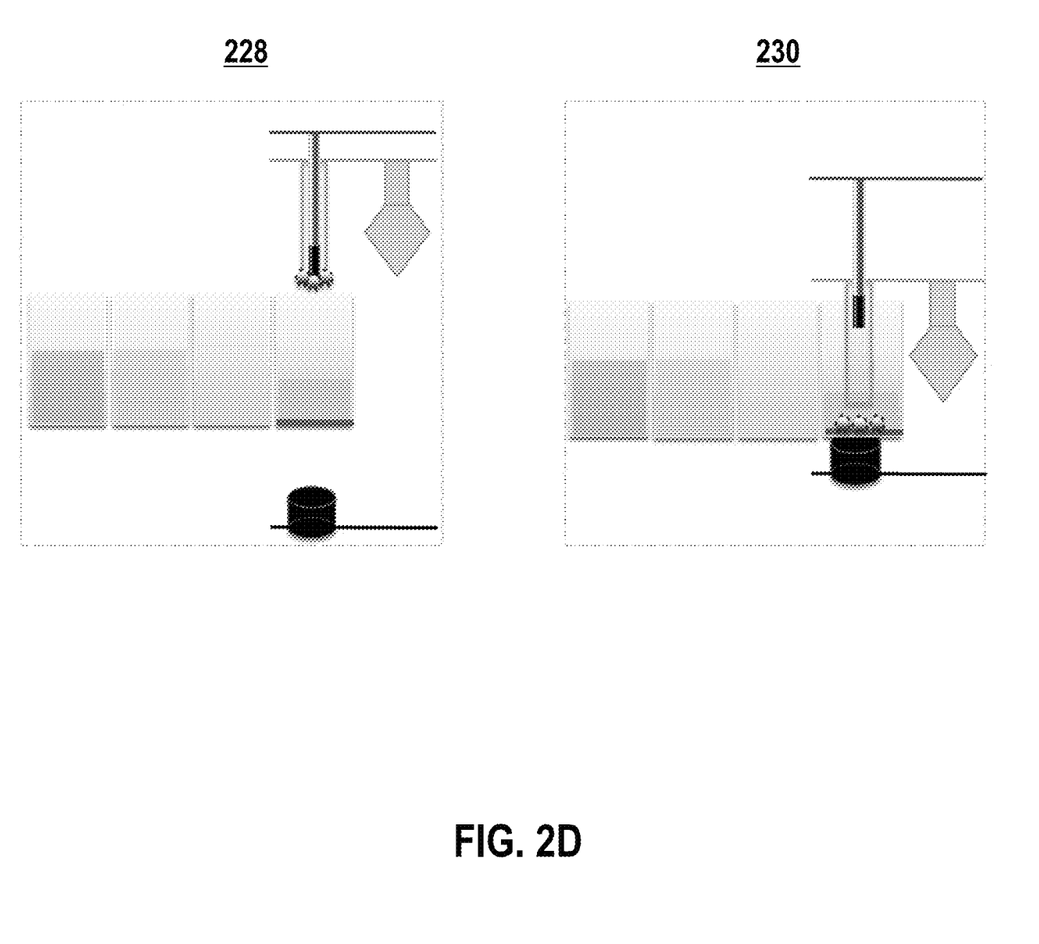

FIG. 2D illustrates the detection step and includes the following sub-steps: at sub-step 228, the magnetic rod 114 and the sheath 116 are at their upper position above the fourth reaction well 102D with the magnetic beads being attached to the sheath 116, and the magnet 110 is at its lower position; at sub-step 230, the sheath 116 is moved to its lower position, and the magnet 110 is moved to its upper position to capture the magnetic beads 104 to the bottom surface of the fourth reaction well 102D on which the electrode 108 locates. Electrochemical detection is then performed by the electrode 108.

Figure 3:
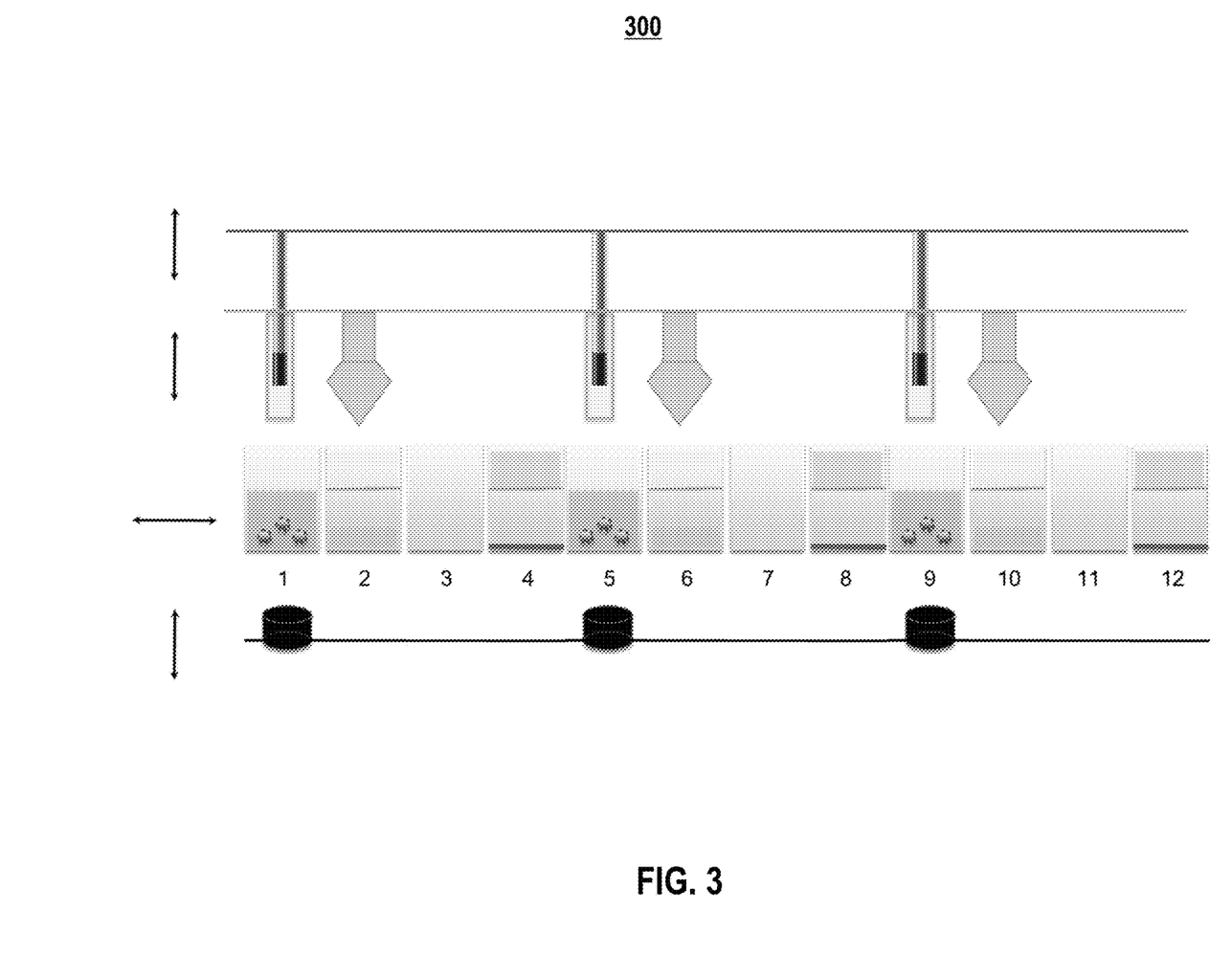
FIG. 3 illustrates a schematic diagram, in a side view, of another exemplary system for automated handling of multiple samples, according to some embodiments of the present disclosure.

It is understood that system 100 may be scaled up to simultaneously handling multiple samples in an automated manner FIG. 3 illustrates a schematic diagram, in a side view, of another exemplary system 300 for automated handling of multiple samples, according to some embodiments of the present disclosure. As shown in FIG. 3, the system 300 for automated handling of multiple samples can include 3 magnetic manipulators, 3 punches, 12 reaction wells, and 3 magnets in each row. That is, system 100 may be expanded 3 times in the horizontal direction to become system 300 that can handle 3 samples at the same time. It is understood that FIG. 3 is just for illustrative purpose only, and the total number of samples that can be simultaneously handled is not limited to 3.

Figure 4:
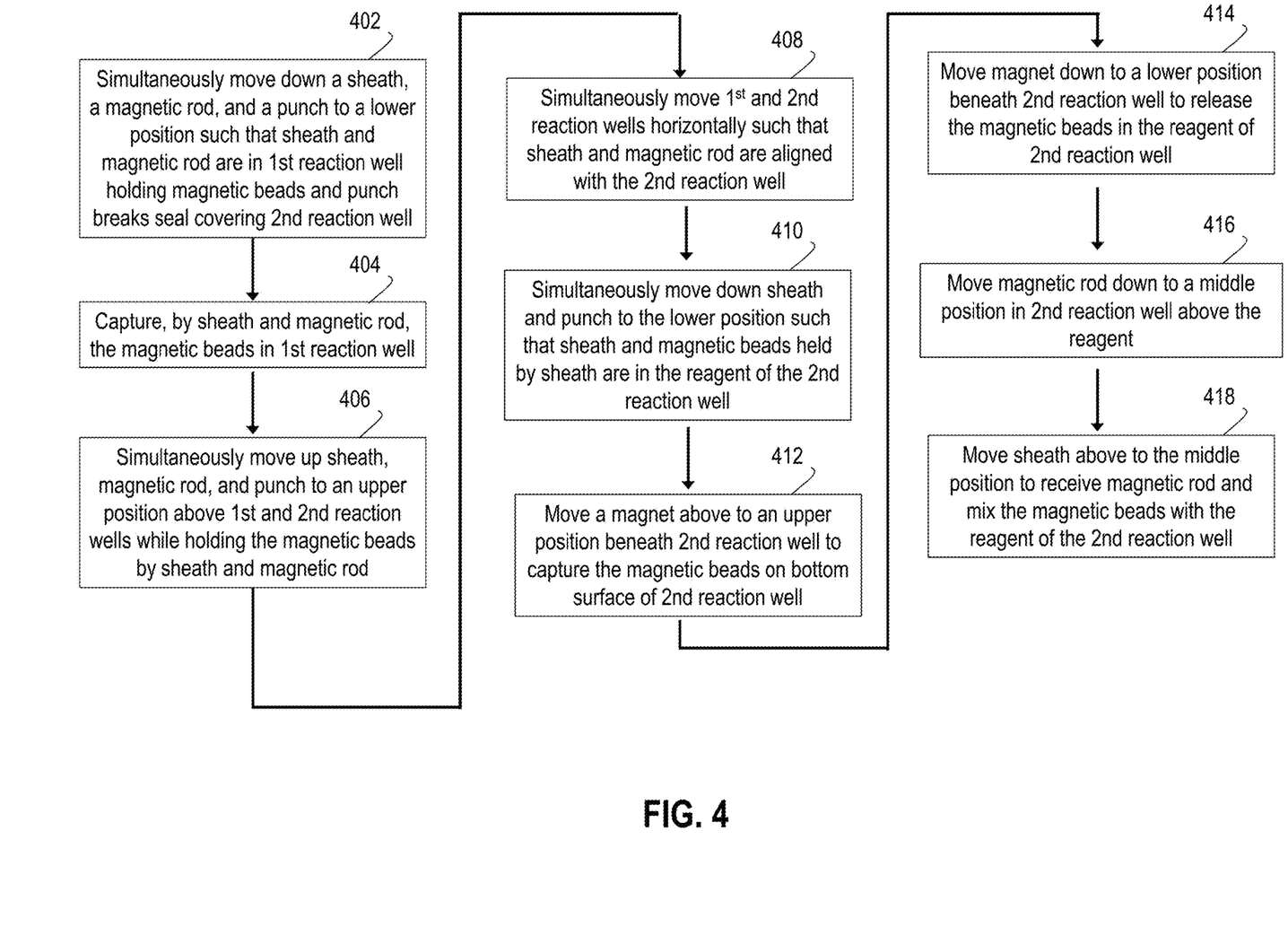
FIG. 4 illustrates a flowchart of an exemplary method for automated sample handling, according to various embodiments of the present disclosure.

FIG. 4 illustrates a flowchart of an exemplary method for automated sample handling, according to various embodiments of the present disclosure.

At step 402, a sheath, a magnetic rod received by the sheath, and a punch connected horizontally with the sheath are simultaneously moved down to a lower position, such that (i) the sheath and the magnetic rod received by the sheath are in a first reaction well holding magnetic beads, and (ii) the punch breaks a seal partitioning a second reaction well to fill a reagent in the second reaction well. In some embodiments, the first reaction well and the second reaction well are adjacent to one another.

At step 404, the magnetic beads in the first reaction well are captured by the sheath and the magnetic rod received by the sheath.

At step 406, the sheath, the magnetic rod received by the sheath, and the punch are simultaneously moved up to an upper position above the first and second reaction wells while holding the magnetic beads by the sheath and the magnetic rod received by the sheath.

At step 408, the first and second reaction wells are simultaneously moved horizontally, such that the sheath and the magnetic rod received by the sheath are aligned with the second reaction well.

At step 410, the sheath and the punch are simultaneously moved down to the lower position, such that the sheath and the magnetic beads held by the sheath are in the reagent of the second reaction well.

At step 412, a magnet is moved above to an upper position beneath the second reaction well to capture the magnetic beads on a bottom surface of the second reaction well.

At step 414, the magnet is moved down to a lower position beneath the second reaction well to release the magnetic beads in the reagent of the second reaction well.

At step 416, the magnetic rod is moved down to a middle position in the second reaction well above the reagent.

At step 418, the sheath is moved above to the middle position to receive the magnetic rod and mix the magnetic beads with the reagent of the second reaction well. In some embodiments, to mix the magnetic beads with the reagent of the second reaction well, the magnetic rod is kept at a position above the second reaction well, such that the magnetic rod is separated from the sheath and the magnetic beads are not captured by the sheath. The sheath is moved above a liquid-air interface to receive the magnetic rod. The magnet is moved down to a lower position beneath the second reaction well to release the magnetic beads in the reagent of the second reaction well. The magnetic rod is moved down to a position above the liquid-air interface in the second reaction well, such that the magnetic beads move away from the well bottom and rise toward the liquid-air interface. The magnetic rod is moved up to a position further away from the liquid-air interface, such that the magnetic beads migrate toward the well bottom due to gravity. The above steps are repeated to mix the magnetic beads with the reagent in the second reaction well.

The above steps can be repeated for the third and fourth reaction wells. The workflow can be configured for different sample handling protocols.

Figure 5:
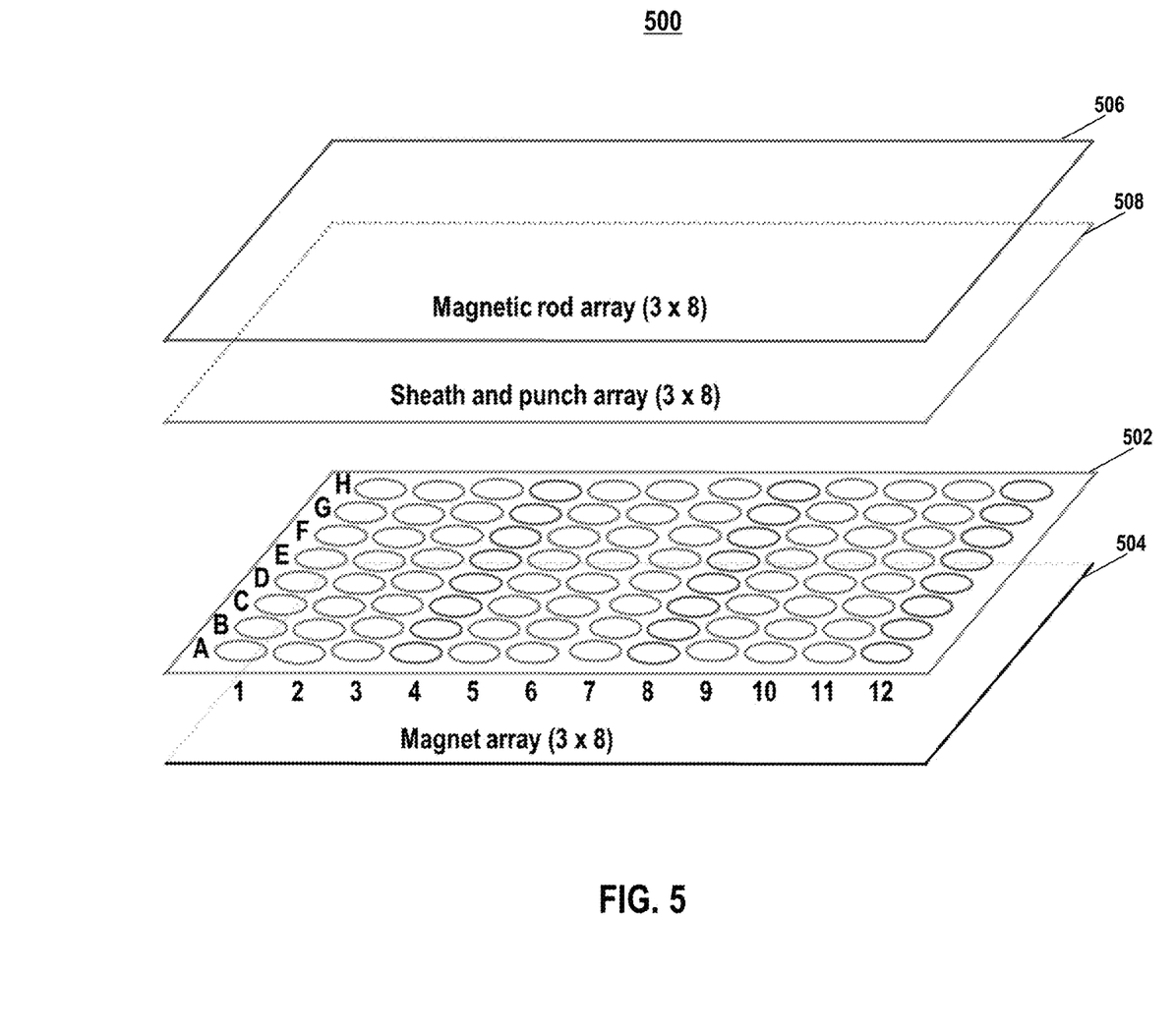
FIG. 5 illustrates a schematic diagram, in an exploded view, of still another exemplary system for automated handling of multiple samples in a 96-well format, according to some embodiments of the present disclosure.

FIG. 5 illustrates a schematic diagram, in an exploded view, of still another exemplary system 500 for automated handling of multiple samples in a 96-well format, according to some embodiments of the present disclosure. As shown in FIG. 5, the system 500 for automated handling of multiple samples can include an array of magnetic rods 506, an array of sheaths and punches 508, an array of reaction wells 502, and an array of magnets 504. In some embodiments, the number of magnets in each column of the array of magnets 504, the number of sheaths in each column of the array of sheaths, and the number of magnetic rods in each column of the array of magnetic rods 506 is the same as the number of reaction wells in each column of the array of reaction wells 502. For example, each of the array of magnetic rods 506, array of sheath and punches 508, and array of magnets 504 may be in a 3 by 8 configuration, i.e., having 8 rows and 3 columns, while the array of reaction wells 502 is in a 12 by 8 configuration, i.e., having 8 rows and 12 columns.

The array of reaction wells 502 are configured to each hold a reagent and collectively move horizontally. At least a first column of the array of reaction wells 502 hold magnetic beads. At least a second column of the array of reaction wells 502 are partitioned by seals. For example, the array of reaction wells 502 may be in a 96-well format that has 8 rows A, B, C, D, E, F, G, and H, each row having 12 reaction wells 1 through 12. At least reaction well 1 in each row may hold magnetic beads, at least reaction well 2 in each row may be partitioned by seals, and at least reaction well 4 in each row may hold electrodes. In one example, reactions wells 1, 5, and 9 in each row hold magnetic beads, reactions wells 2, 6, and 10 in each row are partitioned by seals, and reactions wells 4, 8, and 12 in each row hold electrodes. Additional details of reaction wells have been described above with respect to FIG. 1 and thus, are not repeated for ease of description.

The array of magnets 504 are below the array of reaction wells 502 and configured to collectively move vertically and capture the magnetic beads on bottom surfaces of the first column of the array of reaction wells 502 when moving to an upper position beneath the first column of the array of reaction wells 502. In some embodiments, the array of magnets 504 are further configured to release the magnetic beads when moving to a lower position beneath the first column of the array of reaction wells 502. In some embodiments, the array of magnets 504 are configured to capture the magnetic beads on bottom surfaces of the another column of the array of reaction wells 502 when moving to the upper position beneath the another column of the array of reaction wells 502 when the array of sheaths release the magnetic beads in the reagents of the another column of the array of reaction wells 502. Additional details of magnets have been described above with respect to FIG. 1 and thus, are not repeated for ease of description.

The array of magnetic rods 506 are configured to collectively move vertically, and the array of sheaths in the array of sheaths and punches 508 are between the array of magnetic rods 506 and the array of reaction wells 502 and are configured to collectively move vertically and receive the array of magnetic rods 506, such that the array of sheaths and the array of magnetic rods 506 move independently to manipulate the magnetic beads. In some embodiments, the array of sheaths are configured to capture the magnetic beads when receiving the array of magnetic rods and moving to a lower position in the reagents of the first column of the array of reaction wells, hold the magnetic beads when moving to an upper position above the first column of the array of reaction wells when the array of reaction wells collectively move horizontally, and release the magnetic beads when moving to the lower position in the reagents of another column of the array of reaction wells and separating from the array of magnetic rods. Additional details of magnetic rods and sheaths have been described above with respect to FIG. 1 and thus, are not repeated for ease of description.

The array of punches may be attached to a same plane as the array of sheaths (collectively forming the array of sheaths and punches 508) and configured to collectively move vertically and break the seals of the third column of the array of reaction wells 502 when moving to a lower position in the third column of the array of reaction wells 502. That is, the array of sheaths and the array of punches can be connected to collectively move vertically. Additional details of punches have been described above with respect to FIG. 1 and thus, are not repeated for ease of description.

Figure 6:
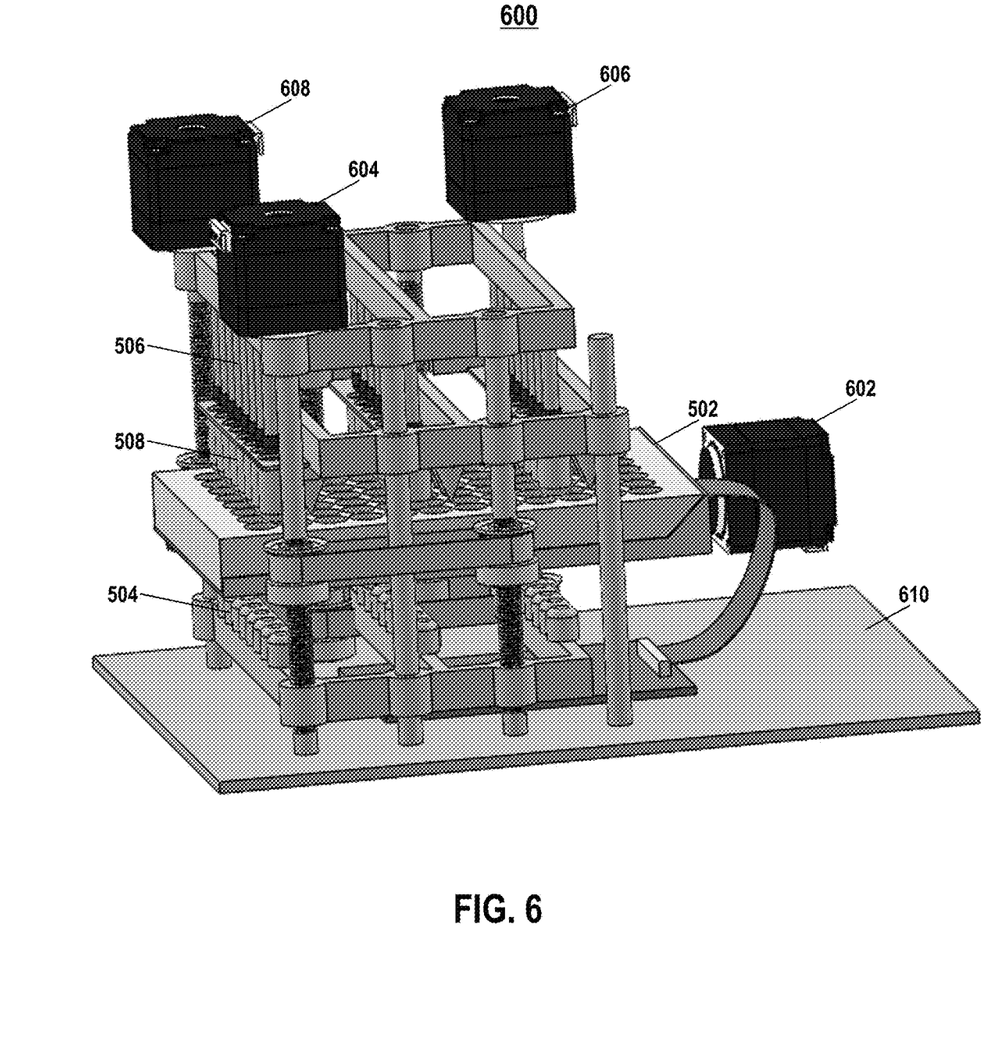
FIG. 6 illustrates a schematic diagram, in a perspective view, of yet another exemplary system for automated handling of multiple samples, according to some embodiments of the present disclosure.

FIG. 6 illustrates a schematic diagram, in a perspective view, of yet another exemplary system 600 for automated handling of multiple samples, according to some embodiments of the present disclosure. Besides components in system 500 as described above with respect to FIG. 5, system 600 further includes electro-mechanical components for driving the linear movements as well as electronic components for conducting the electrochemical detections and controlling the electro-mechanical components.

As shown in FIG. 6, system 600 includes a first driving unit 602 configured to move the array of reaction wells 502 only horizontally along a row direction. The first driving unit 602 may include stepper motors or any other suitable linear actuators mechanically connected to the array of reaction wells 502. System 600 also includes a second driving unit 604 configured to move the array of magnets 504 only vertically. The second driving unit 604 may include stepper motors or any other suitable linear actuators mechanically connected to the array of magnets 504. System 600 further includes a third driving unit 606 and a fourth driving unit 608 configured to move the array of magnetic rods 506 and the array of sheaths and punches 508, respectively, only vertically. The third and fourth driving units 606 and 608 may include stepper motors or any other suitable linear actuators mechanically connected to the array of magnetic rods 506 and the array of sheaths and punches 508, respectively.

As shown in FIG. 6, system 600 includes a circuit board 610 configured to perform electrochemical detections in parallel. At least a fourth column of the array of reaction wells 502 hold electrodes electrically connected to the circuit board 610. The circuit board 610 may include a printed circuit board (PCB). In some embodiments, the circuit board 610 is also electrically connected to driving units 602, 604, 606, and 608 and configured to control the driving units 602, 604, 606, and 608.

According to one aspect of the present disclosure, a system for automated sample handling includes a plurality of reaction wells, a magnet, a magnetic manipulator, and a punch. The plurality of reaction wells are configured to each hold a reagent and collectively move horizontally. A first reaction well of the plurality of reaction wells holds magnetic beads, and a second reaction well of the plurality of reaction wells is partitioned by a seal. The magnet is configured to move vertically and capture the magnetic beads on a bottom surface of the first reaction well when moving to an upper position beneath the first reaction well. The magnetic manipulator is configured to manipulate the magnetic beads and includes a magnetic rod configured to move vertically to be above or in the first reaction well and a sheath below the magnetic rod and configured to move vertically and receive the magnetic rod. The punch is configured to move vertically and break the seal of the second reaction well when moving to a lower position in the second reaction well.

In some embodiments, a third reaction well of the plurality of reaction wells holds an electrode.

In some embodiments, each of the plurality of reaction wells has a same dimension.

In some embodiments, the plurality of reaction wells are fixed vertically.

In some embodiments, the plurality of reaction wells are arranged along a direction in which the plurality of reaction wells collectively move.

In some embodiments, the reagent is held below the seal in the second reaction well.

In some embodiments, the magnet is further configured to release the magnetic beads when moving to a lower position beneath the first reaction well.

In some embodiments, the magnet is fixed horizontally.

In some embodiments, the magnetic manipulator is configured to transfer the magnetic beads from the first reaction well to another reaction well of the plurality of reaction wells as the plurality of reaction wells collectively move horizontally.

In some embodiments, to transfer the magnetic beads, the sheath is configured to capture the magnetic beads when receiving the magnetic rod and moving to a lower position in the reagent of the first reaction well, hold the magnetic beads when moving to an upper position above the first reaction well while the plurality of reaction wells collectively move horizontally, and release the magnetic beads when separating from the magnetic rod and moving to the lower position in the reagent of the another reaction well.

In some embodiments, the magnet is configured to capture the magnetic beads on a bottom surface of the another reaction well when moving to the upper position beneath the another reaction well while the sheath releases the magnetic beads in the reagent of the another reaction well.

In some embodiments, the magnetic manipulator is configured to mix the magnetic beads with the reagent in the first reaction well.

In some embodiments, to mix the magnetic beads with the reagent, the sheath is configured to receive the magnetic rod when moving to a middle position in the first reaction well above a liquid-air interface.

In some embodiments, the sheath and the punch are connected horizontally to collectively move vertically.

In some embodiments, the sheath and the punch are aligned with two adjacent reaction wells of the plurality of reaction wells, respectively.

In some embodiments, the first reaction well and the second reaction well are adjacent to one another.

In some embodiments, the third reaction well is partitioned by another seal.

According to another aspect of the present disclosure, a system for automated sample handling includes an array of reaction wells, an array of magnets below the array of reaction wells, an array of magnetic rods, and an array of sheaths between the array of magnetic rods and the array of reaction wells. The array of reaction wells is configured to each hold a reagent and collectively move horizontally. At least a first column of the array of reaction wells hold magnetic beads. The array of magnets is configured to collectively move vertically and capture the magnetic beads on bottom surfaces of the first column of the array of reaction wells when moving to an upper position beneath the first column of the array of reaction wells, an array of magnetic rods is configured to collectively move vertically. The array of sheaths is configured to collectively move vertically and receive the array of magnetic rods, such that the array of sheaths and the array of magnetic rods move independently to manipulate the magnetic beads.

In some embodiments, the system further includes a circuit board configured to perform electrochemical detections in parallel. At least a fourth column of the array of reaction wells hold electrodes electrically connected to the circuit board.

In some embodiments, at least a third column of the array of reaction wells are partitioned by seals.

In some embodiments, the system further includes an array of punches attached to a same plane as the array of sheaths and configured to collectively move vertically and break the seals of the third column of the array of reaction wells when moving to a lower position in the third column of the array of reaction wells.

In some embodiments, the reagents are held below the seals in the second column of the array of reaction wells.

In some embodiments, the array of sheaths and the array of punches are connected to collectively move vertically.

In some embodiments, the array of reaction wells is in a 96-well plate format.

In some embodiments, the system further includes a first driving unit configured to move the array of reaction wells only horizontally along a row direction.

In some embodiments, the array of magnets are further configured to release the magnetic beads when moving to a lower position beneath the first column of the array of reaction wells.

In some embodiments, the system further includes a second driving unit configured to move the array of magnets only vertically.

In some embodiments, the array of sheaths are configured to capture the magnetic beads when receiving the array of magnetic rods and moving to a lower position in the reagents of the first column of the array of reaction wells, hold the magnetic beads when moving to an upper position above the first column of the array of reaction wells when the array of reaction wells collectively move horizontally, and release the magnetic beads when moving to the lower position in the reagents of another column of the array of reaction wells and separating from the array of magnetic rods.

In some embodiments, the array of magnets are configured to capture the magnetic beads on bottom surfaces of the another column of the array of reaction wells when moving to the upper position beneath the another column of the array of reaction wells when the array of sheathes release the magnetic beads in the reagents of the another column of the array of reaction wells.

In some embodiments, a number of magnets in each column of the array of magnets, a number of sheaths in each column of the array of sheaths, and a number of magnetic rods in each column of the array of magnetic rods is the same as a number of reaction wells in each column of the array of reaction wells.

According to still another aspect of the present disclosure, a method for automated sample handling is disclosed. A sheath, a magnetic rod received by the sheath, and a punch connected horizontally with the sheath simultaneously move down to a lower position, such that (i) the sheath and the magnetic rod received by the sheath are in a first reaction well holding magnetic beads, and (ii) the punch breaks a seal partitioning a second reaction well to fill a reagent in the second reaction well. The sheath and the magnetic rod received by the sheath capture the magnetic beads in the first reaction well. The sheath, the magnetic rod received by the sheath, and the punch simultaneously move up to an upper position above the first and second reaction wells while holding the magnetic beads by the sheath and the magnetic rod received by the sheath. The first and second reaction wells simultaneously move horizontally, such that the sheath and the magnetic rod received by the sheath are aligned with the second reaction well. The sheath and the punch simultaneously move down to the lower position, such that the sheath and the magnetic beads held by the sheath are in the reagent of the second reaction well. A magnet moves above to an upper position beneath the second reaction well to capture the magnetic beads on a bottom surface of the second reaction well.

In some embodiments, the first reaction well and the second reaction well are adjacent to one another.

In some embodiments, the magnetic rod is kept at a position above the second reaction well, such that the magnetic rod is separated from the sheath and the magnetic beads are not captured by the sheath, the sheath is moved above a liquid-air interface to receive the magnetic rod, the magnet is moved down to a lower position beneath the second reaction well to release the magnetic beads in the reagent of the second reaction well, the magnetic rod is moved down to a position above the liquid-air interface in the second reaction well, such that the magnetic beads move away from the well bottom and rise toward the liquid-air interface, the magnetic rod is moved up to a position further away from the liquid-air interface, such that the magnetic beads migrate toward the well bottom due to gravity, and the above steps are repeated to mix the magnetic beads with the reagent in the second reaction well.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A system for automated sample handling, comprising:
   a plurality of reaction wells configured to each hold a reagent, and collectively move horizontally, the plurality of reaction wells including
   a first reaction well of the plurality of reaction wells holding magnetic beads,
   a second reaction well, of the plurality of reaction wells partitioned by a partition seal;
   a magnet configured to move vertically and capture the magnetic beads on a bottom surface of the first reaction well when moving to an upper position beneath the first reaction well;
   a magnetic manipulator configured to manipulate the magnetic beads and comprising:
      a magnetic rod configured to move vertically to be above or in the first reaction well;
      a sheath below the magnetic rod and configured to move vertically and receive the magnetic rod;
      a punch configured to move vertically and break the seal of the second reaction well when moving to a lower position in the second reaction well; and
   at least one driving unit coupled to the plurality of reaction wells, the magnet, the magnetic rod, the sheath, and the punch, wherein the at least one driving unit is configured to:
      move the magnet vertically towards the first reaction well so that the magnetic beads on a bottom surface of the first reaction well are captured when moving to an upper position beneath the first reaction well;
      simultaneously move the sheath, the magnetic rod received by the sheath, and the punch connected horizontally with the sheath to a lower position, such that
         (i) the sheath and the magnetic rod received by the sheath are below a liquid-air interface in a first reaction well holding magnetic beads,
         (ii) the magnetic beads are captured by the sheath, and
         (iii) the punch breaks the partition seal inside the second reaction well to fill a first reagent in the second reaction well;
      move the magnet vertically away from the first reaction well so that the magnetic beads move upward towards the magnetic rod;
      simultaneously move the sheath, the magnetic rod received by the sheath, and the punch to an upper position above the first and second reaction wells while holding the magnetic beads by the sheath and the magnetic rod received by the sheath;
      simultaneously move the first and second reaction wells horizontally so that the sheath and the magnetic rod received by the sheath are aligned with the second reaction well;
      simultaneously move the sheath and the punch to the lower position so that the sheath and the magnetic beads held by the sheath are below a liquid-air interface in the reagent of the second reaction well;
      maintain the magnetic rod above the liquid-air interface of the second reaction well while the sheath is moved below the liquid-air interface of the second reaction well; and
      move the magnet vertically towards the second reaction well to capture the magnetic beads on a bottom surface of the second reaction well.

2. The system of claim 1, wherein a third reaction well of the plurality of reaction wells holds an electrode.

3. The system of claim 1, wherein the plurality of reaction wells are arranged along a direction in which the plurality of reaction wells collectively move.

4. The system of claim 1, wherein a second reagent is held below the seal in the second reaction well, and wherein the second reagent is different from the first reagent above the partition seal.

5. The system of claim 1, wherein the magnet is further configured to release the magnetic beads when moving to a lower position beneath the first reaction well.

6. The system of claim 1, wherein the magnet is fixed horizontally.

7. The system of claim 1, wherein the sheath and the magnetic rod received by the sheath are configured to transfer the magnetic beads from the first reaction well to another reaction well of the plurality of reaction wells as the plurality of reaction wells collectively move horizontally.

8. The system of claim 7, wherein to transfer the magnetic beads, the sheath is configured to:
   capture the magnetic beads when receiving the magnetic rod and moving to a lower position in the reagent of the first reaction well;
   hold the magnetic beads when moving to an upper position above the first reaction well while the plurality of reaction wells collectively move horizontally; and
   release the magnetic beads when separating from the magnetic rod and moving to the lower position in the reagent of the another reaction well.

9. The system of claim 8, wherein the magnet is configured to capture the magnetic beads on a bottom surface of the another reaction well when moving to the upper position beneath the another reaction well while the sheath releases the magnetic beads in the reagent of the another reaction well.

10. The system of claim 1, wherein the sheath and the magnetic rod received by the sheath are configured to mix the magnetic beads with the reagent in the first reaction well.

11. The system of claim 10, wherein to mix the magnetic beads with the reagent, the sheath is configured to receive the magnetic rod when moving to a middle position in the first reaction well above a liquid-air interface.

12. The system of claim 1, wherein e sheath and the punch are connected horizontally to collectively move vertically.

13. The system of claim 12, wherein the sheath and the punch are aligned with two adjacent reaction wells of the plurality of reaction wells, respectively.

14. The system of claim 1, wherein the first reaction well and the second reaction well are adjacent to one another.

15. The system of claim 2, wherein the third reaction well is partitioned by another seal inside the third reaction well.

16. A method for automated magnetic bead transfer and reagent mixing using the system of claim 1, comprising;
  simultaneously moving down the sheath, the magnetic rod received by the sheath, and the punch connected horizontally with the sheath to a lower position, such that (i) the sheath and the magnetic rod received by the sheath are in the first reaction well holding magnetic beads, and (ii) the punch breaks the partition seal inside a second reaction well to fill a reagent in the second reaction well, wherein the reagent is located above the partition seal inside the second reaction well prior to the partition seal being broken by the punch;
  capturing, by the sheath and the magnetic rod received by the sheath, the magnetic beads in the first reaction well;
  simultaneously moving up the sheath, the magnetic rod received by the sheath, and the punch to an upper position above the first and second reaction wells while holding the magnetic beads by the sheath and the magnetic rod received by the sheath;
  simultaneously moving the first and second reaction wells horizontally, such that the sheath and the magnetic rod received by the sheath are aligned with the second reaction well;
  simultaneously moving down the sheath and the punch to the lower position, such that the sheath and the magnetic beads held by the sheath are in the reagent of the second reaction well;
  maintaining the magnetic rod above a liquid-air interface of the second reaction well while the sheath is moved below the liquid-air interface of the second reaction well;
  moving a magnet above to an upper position beneath the second reaction well to capture the magnetic beads on a bottom surface of the second reaction well;
  keeping the magnetic rod at a position above the second reaction well, such that the magnetic rod is separated from the sheath and the magnetic beads are not captured by the sheath;
  moving the sheath above the liquid-air interface to receive the magnetic rod; moving the magnet down to a lower position beneath the second reaction well to release the magnetic beads in the reagent of the second reaction well;
  moving the magnetic rod down to a position above the liquid-air interface in the second reaction well, such that the magnetic beads move away from the bottom surface of the second reaction well and rise toward the liquid-air interface;
  moving the magnetic rod up to a position further away from the liquid-air interface, such that the magnetic beads migrate toward the bottom surface of the second reaction well due to gravity; and
  keeping the sheath above the liquid-air interface, repeating the above vertical movement of the magnetic rod and magnet to mix the magnetic beads with the reagent in the second reaction well.

17. The method of claim 16, wherein the first reaction well and the second reaction well are adjacent to one another.

* * * * *